United States Patent [19]

Heitmann

[11] 3,996,607
[45] Dec. 7, 1976

[54] SYSTEM FOR DIGITAL TRANSMISSION OF COLOR TELEVISION SIGNALS

[75] Inventor: Jürgen Heitmann, Seeheim, Germany

[73] Assignee: Robert Bosch G.m.b.H., Stuttgart, Germany

[22] Filed: July 17, 1975

[21] Appl. No.: 596,842

[30] Foreign Application Priority Data

July 18, 1974 Germany .......................... 2434471

[52] U.S. Cl. ................................................ 358/13
[51] Int. Cl.² ........................................ H04N 9/32
[58] Field of Search ................ 358/13; 178/DIG. 3; 325/38 B

[56] References Cited

UNITED STATES PATENTS 3,588,364    6/1971    Wallingford et al. ............ 325/38 B

*Primary Examiner*—Robert L. Richardson
*Attorney, Agent, or Firm*—Littlepage, Quaintance, Murphy & Dobyns

[57] ABSTRACT

A color television signal is divided into a luminance signal component Y and two color difference signal components R—Y and B—Y. In differential pulse code modulation for transmission and demodulation after reception, the color difference signals are coded and decoded in a time multiplex mode respectively by a single coder and a single decoder.

8 Claims, 6 Drawing Figures

SYSTEM FOR DIGITAL TRANSMISSION OF COLOR TELEVISION SIGNALS

BACKGROUND OF THE INVENTION

1. Field of the Invention

The invention relates to a system for digital transmission of color television signals according to the difference-pulse-code modulation (dpcm) method.

2. Description of the Prior Art

Various methods are known for digital transmission of color television signals. In one of these methods, the complete color television signal is coded according to the pcm method. Because the completed color television signal is coded, a large channel capacity is required. By this system, data flow at a transmission quality that corresponds approximately to television broadcasting would require about 100 Mbit/s.

A separate coding of the luminance and chrominance components of the color television signal allows further reduction of the data flow. For this purpose, known systems employ a separate a dpcm coder for the luminance signal and for each of the two color-difference signals. Such dpcm coders are quite costly for such multiple use.

SUMMARY OF THE INVENTION

The proposed system for digital transmission of color television signals according to the dpcm method involves a smaller equipment cost while meeting the desired quality standards.

In the proposed system, a coder and a decoder are provided for several components of the color television signals. In the coder and the decoder for these components, storage elements are provided which are triggered according to a time-division multiplex method.

While retaining a favorable data reduction factor, the proposed system achieves a substantial decrease in expense since some relatively large electronic structural components of the dpcm coder, such as analog-to-digital converters and quantizers, may be used jointly for several color television signal components.

By means of the system of the invention, it is possible to code and decode, for example, the three primary signals—red, green and blue. The difference between the various scanning rates of the luminance signal and the color-difference signals is favorable to a further development in the coding of these signals according to the invention. In this development, a first coder and a first decoder are provided for the luminance signal. Both color-difference signals are fed to a second coder, and a second decoder decodes the coded color-difference signals.

BRIEF DESCRIPTION OF THE DRAWINGS

The invention will be explained in greater detail with the aid of the FIGS. These figures show the following.

Similar elements in the FIGS. are provided with the same reference symbols.

DESCRIPTION OF THE PREFERRED EMBODIMENT

Figure 1:
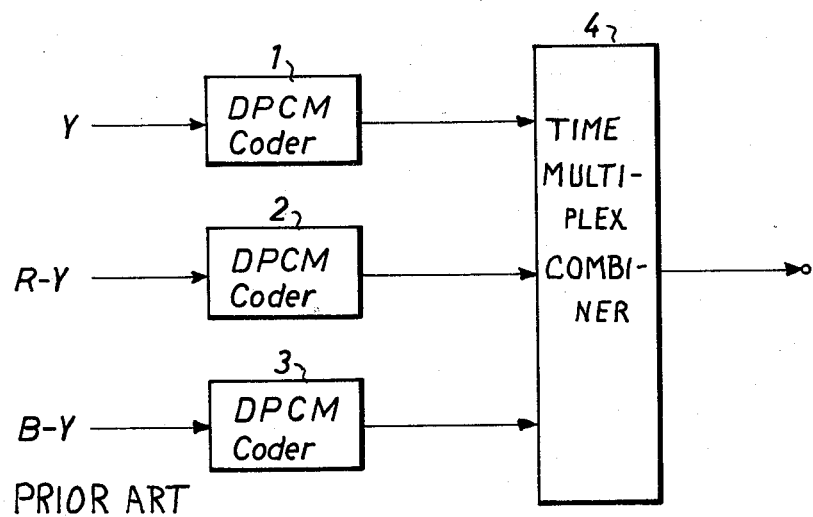
FIG. 1 illustrates a known arrangement for digital coding in diagrammatical representation.

In the arrangement of FIG. 1, the luminance signal Y, as well as the color difference signals R—Y and B—Y, are fed to dpcm coders 1, 2, and 3. At the output of these coders, digital dpcm signals are present which are combined in a circuit 4, for example, by time-multiplex, and are ready for transmission.

Figure 2:
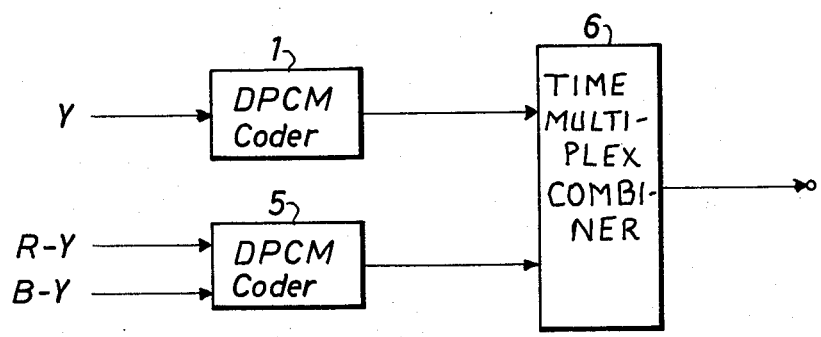
FIG. 2 likewise illustrates in diagrammatical representation, an embodiment of a coder according to the invention.

In contrast to the known arrangement according to FIG. 1, in the system of the invention as illustrated in FIG. 2, the color-difference signals R—Y and B—Y are fed into one coder 5. The luminance signal Y is coded, in the same manner as in the known arrangement, in a separate dpcm coder 1. The output signals of the coders can then again be combined and transmitted in a circuit 6 similar to circuit 4. Circuits 4 and 6 are known per se and are not described in detail since this is not necessary for the understanding of the present invention.

Figure 3:
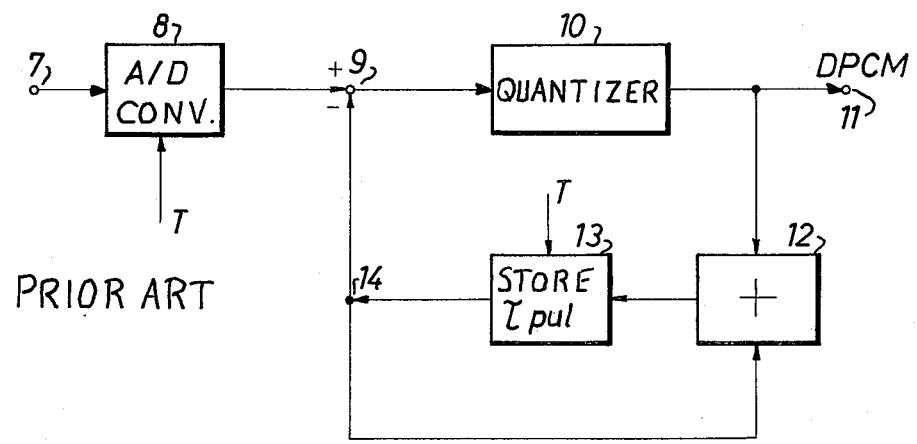
FIG. 3 illustrates an embodiment of a known dpcm coder.

As an example of a known dpcm coder, a circuit is indicated in FIG. 3. The signals to be coded, which may be the luminance signal of a color television signal, are fed into the coder at terminal 7. First, in an analog-to-digital converter 8, the analog signal is converted into a corresponding digital signal. A scanning train of clock pulses T is fed into the analog-digital converter. This train of pulses ordinarily has a frequency twice that of the maximum transmitting frequency. By way of a subtraction element 9, the digital signals reach a quantizer 10. This quantizer 10 assigns the many possible amplitude levels of the transmitting signal to a few pre-selected amplitude levels, which is necessary for a bandwidth-saving transmission. The output signal of the quantizer is fed both to the output 11 of the coder and to the input of an addition circuit 12. This addition circuit 12 and a store 13 constitute a so-called predictor at whose output 14 the most probable value for the next scanning is present. This value is deducted, by means of subtraction element 9, from the input signal, so that only the difference between the true scanning value and the predicted value needs to be transmitted, which is the basic concept of the dpcm.

Figure 4:
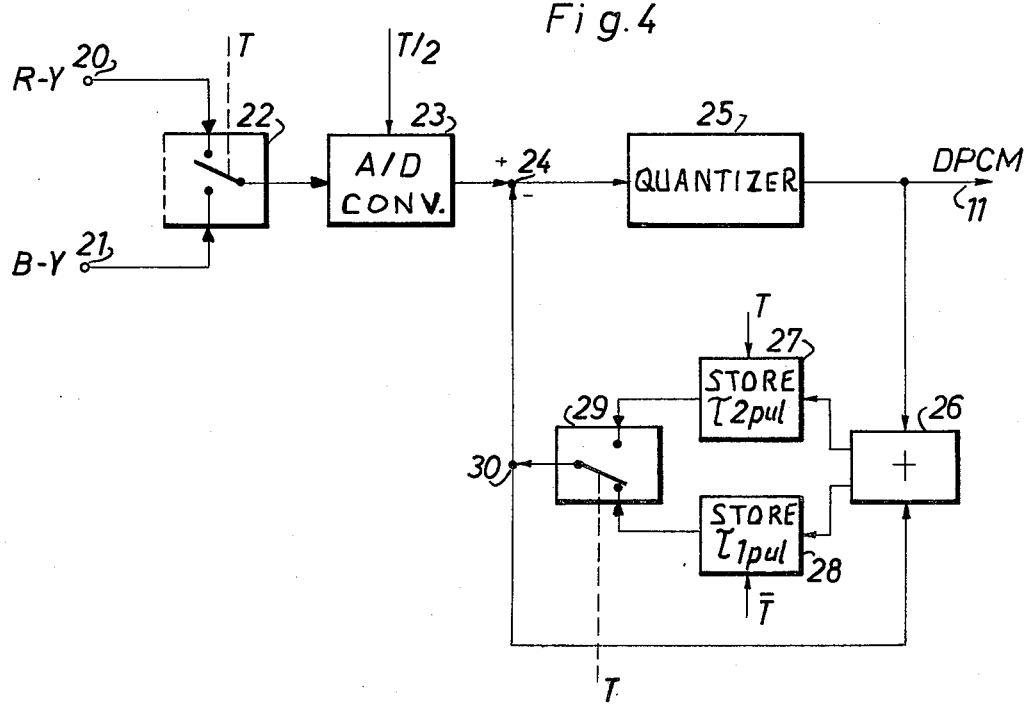
FIG. 4 illustrates an embodiment of a coder according to the invention as block diagram.
Figure 6:
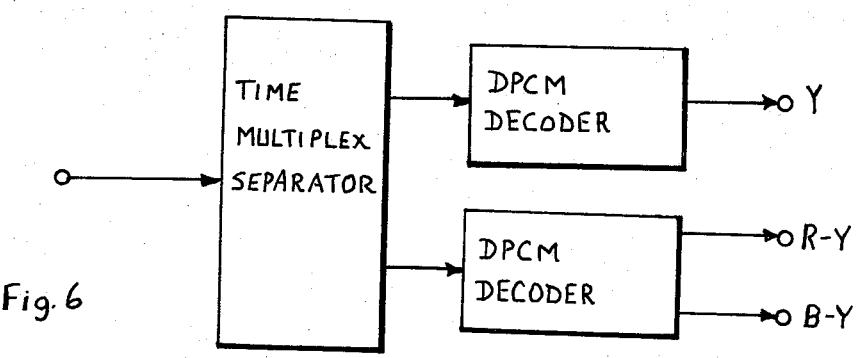
FIG. 6 illustrates in diagrammatical representation an embodiment of a decoder according to the invention.

FIG. 4 shows an embodiment of the invention. Color-difference signals R—Y and B—Y are fed to inputs 20 and 21. An electronic switch 22 feeds the color-difference signal alternatingly, in periods T, to the analog-to-digital converter 23. The converter 23 corresponds essentially to the analog-to-digital converter 8 of the arrangement of FIG. 3. It is, however, triggered with a frequency $T_2$, which is twice as high as the frequency T. The digital color-difference signals reach a quantizer 25 via a subtraction element 24. Subtraction element 24 and quantizer 25, as well as addition circuit 26, correspond to the corresponding components of the arrangement of FIG. 3.

In contrast to the known arrangement, however, two stores 27 and 29 are connected to the output of addition circuit 26, namely, one for color-difference signal R—Y, and one for color-difference signal B—Y. The outlets of stores 27 and 28 are alternatingly connected, by way of an electronic switch 29, to point 30 and thus to the inverting input of subtraction element 24, and to the second input of addition circuit 26. Switch 29 is likewise triggered in period T. The stores themselves can be successfully established with the aid of edgecontrolled D-flip-flops to which T on the one hand and T̄ on the other hand are fed as clock pulse.

The clock pulses T and $T_2$ are produced in pulse generators known per se which do not need to be described in detail within the scope of this specification.

The invention was explained with the aid of a simple predictor. However, predictors are known wherein more than one scanning value is used for prediction. In this system, too, the invention can be used successfully, when all scanning value stores are provided in each case for one of the color-difference signals.

Figure 5:
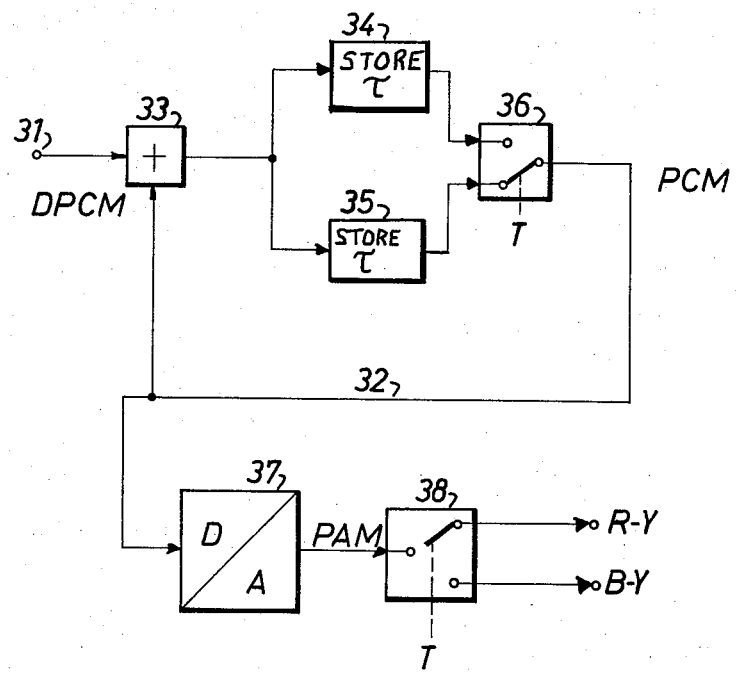
FIG. 5 illustrates an embodiment of a decoder according to the invention.

Figure 5 shows diagrammatically a decoding circuit for decoding dpcm signals which are obtained, for example, by means of the circuit according to FIG. 4, and which are fed in at terminal 31. The circuit constitutes a dpcm coder, known per se, wherein, by way of a return circuit 32, pcm signals are added to the input signals in an addition circuit 33.

In contrast to the traditional circuits, only two stores 34 and 35 are provided whose outputs are triggered with a clock frequency by a switch 26, similarly to stores 27 and 28 in FIG. 4. The pcm signals thus produced are converted, in the digital-to-analog converter 37, into time-multiplex pulse amplitude modulated (PAM) signals, which in turn are converted, by means of the time demultiplexer 38, into the two color-difference signals R—Y and B—Y. The time demultiplexer 38 consists essentially of an electronic switch which, like switch 36, is triggered by a clock (or synchronous impulse) frequency T.

What is claimed is:

1. In a system for digital transmission of a color television signal comprising several chrominance and luminance signal components comprising:
    A. a coder for coding the color television signal by difference pulse code modulation,
    B. means for transmitting the coded signal, and
    C. a decoder for receiving and decoding the transmitted signal
    the improvement comprising
    D. means for time multiplexing a plurality of said signal components in a single said coder, including means responsive to a clock signal for triggering the coder to operate in a time multiplex mode, and
    E. means for time demultiplexing said plurality of said signal components in a single said decoder, including means responsive to the clock signal for triggering the decoder to operate in a time multiplex mode.

2. A system according to claim 1 wherein said coder is a first coder for use with two color-difference signal components of the color television signal and said decoder is a first decoder for use with the color difference signal components, and further comprising a second coder and a second decoder for separate use with a luminance signal component of the color television signal.

3. A system according to claim 2, wherein the first coder contains an input switch which alternately transmits the two color-difference signals and is switched at a frequency which corresponds to a scanning frequency required for the transmission of the color-difference signals, and that the first coder also includes a predictor with two store means which are triggered alternately at the same frequency.

4. A system according to claim 2, wherein the first decoder contains an addition circuit to one input of which the difference pulse code modulation signals are fed, wherein the output of the addition circuit is connected to two stores, wherein the outputs of the stores are connected to the inputs of a switch whose output signals are fed, on the one hand, to another input of the addition circuit, and on the other hand, to a digital-to-analog converter, and wherein output signals from the digital-to-analog converter are divided, by means of a time-multiplexer, into the color-difference signals.

5. In a system for digital transmission of a color television signal comprising several signal components including color-difference signal components, comprising:
    A. a coder for coding the color television signal by difference pulse code modulation,
    B. means for transmitting the coded signal, and
    C. a decoder for receiving and decoding the transmitted signal
    the improvement comprising
    D. means for time multiplexing a plurality of said color-difference signal components in a single said coder, including means responsive to a clock signal for triggering the coder to operate in a time multiplex mode, and
    E. means for time demultiplexing said plurality of said color-difference signal components in a single said decoder, including means responsive to the clock signal for triggering the decoder to operate in a time multiplex mode.

6. A system according to claim 5 wherein said coder is a first coder for use with two color-difference signal components of the color television signal and said decoder is a first decoder for use with the color-difference signal components, and further comprising a second coder and a second decoder for separate use with a luminance signal component of the color television signal.

7. A system according to claim 6, wherein the first coder contains an input switch which alternately transmits the two color-difference signals and is switched at a frequency which corresponds to a scanning frequency required for the transmission of the color-difference signals, and that the first coder also includes a predictor with two store means which are triggered alternately at the same frequency.

8. A system according to claim 6, wherein the first decoder contains an addition circuit to one input of which difference pulse-code modulation signals are fed, wherein the output of the addition circuit is connected to two stores, wherein the outputs of the stores are connected to the inputs of a switch whose output signals are fed, on the one hand, to another input of the addition circuit, and on the other hand, to a digital-to-analog converter, and wherein output signals from the digital-to-analog converter are divided, by means of a time-multiplexer, into the color-difference signals.

* * * * *

UNITED STATES PATENT AND TRADEMARK OFFICE
CERTIFICATE OF CORRECTION

PATENT NO. : 3,996,607
DATED : December 7, 1976
INVENTOR(S) : Jurgen Heitmann

It is certified that error appears in the above-identified patent and that said Letters Patent are hereby corrected as shown below:

Column 2, line 60, change "29" to --28--.
Column 3, line 2, delete "T" and insert -- $\overline{T}$ --.
Column 3, line 21, change "26" to --36--.

Signed and Sealed this

Third Day of May 1977

[SEAL]

Attest:

RUTH C. MASON
*Attesting Officer*

C. MARSHALL DANN
*Commissioner of Patents and Trademarks*